(12) United States Patent
Hsu et al.

(10) Patent No.: US 7,580,200 B2
(45) Date of Patent: Aug. 25, 2009

(54) OPTICAL ZOOM LENS

(75) Inventors: Te-Lun Hsu, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/964,774

(22) Filed: Dec. 27, 2007

(65) Prior Publication Data

US 2009/0073575 A1 Mar. 19, 2009

(30) Foreign Application Priority Data

Sep. 14, 2007 (CN) .......... 2007 1 0201716

(51) Int. Cl.
*G02B 15/14* (2006.01)

(52) U.S. Cl. .................... 359/680; 359/689

(58) Field of Classification Search .......... 359/680–682
See application file for complete search history.

(56) References Cited

U.S. PATENT DOCUMENTS

| 6,961,191 | B2 | 11/2005 | Sato | |
|---|---|---|---|---|
| 2005/0041303 | A1* | 2/2005 | Nanba et al. | 359/680 |
| 2005/0286138 | A1* | 12/2005 | Matsusaka | 359/680 |

* cited by examiner

*Primary Examiner*—Darryl J Collins
(74) *Attorney, Agent, or Firm*—Zhigang Ma

(57) ABSTRACT

An optical zoom lens includes, in this order from the object side to the image side thereof, a first lens group of negative refraction power, a second lens group of positive refraction power, and a third lens group of positive refraction power. The optical zoom lens satisfies the formulas of: $-0.45 < Fw/f1 < -0.3$; and $0.4 < f2/|f1| < 0.8$, where Fw is the smallest effective focal length of the optical zoom lens, f1 is the effective focal length of the first lens group, and f2 is the effective focal length of the second lens group.

11 Claims, 15 Drawing Sheets

OPTICAL ZOOM LENS

BACKGROUND

1. Technical Field

The invention relates to optical technology, and particularly, relates to an optical zoom lens with short overall length.

2. Description of Related Art

In recent years, resolution of image sensing chips has increased, while size of the image sensing chips has decreased. Therefore, it has become desirable to develop an optical zoom lens with a short overall length and with an optical performance that matches image sensing chips having enhanced resolution and size.

SUMMARY

In a present embodiment, an optical zoom lens includes, in this order from the object side to the image side thereof, a first lens group of negative refraction power, a second lens group of positive refraction power, and a third lens group of positive refraction power. The optical zoom lens satisfies the formulas of: $-0.45 < Fw/f1 < -0.3$; and $0.4 < f2/|f1| < 0.8$, where Fw is the smallest effective focal length of the optical zoom lens, f1 is the effective focal length of the first lens group, and f2 is the effective focal length of the second lens group.

BRIEF DESCRIPTION OF THE DRAWINGS

Many aspects of the present optical zoom lens should be better understood with reference to the following drawings. The components in the drawings are not necessarily drawn to scale, the emphasis instead being placed upon clearly illustrating the principles of the present optical zoom lens. Moreover, in the drawings, like reference numerals designate corresponding parts throughout the several views.

DETAILED DESCRIPTION OF THE EMBODIMENTS

Embodiments of the present zoom lens will now be described in detail with references to the drawings.

Figure 1:
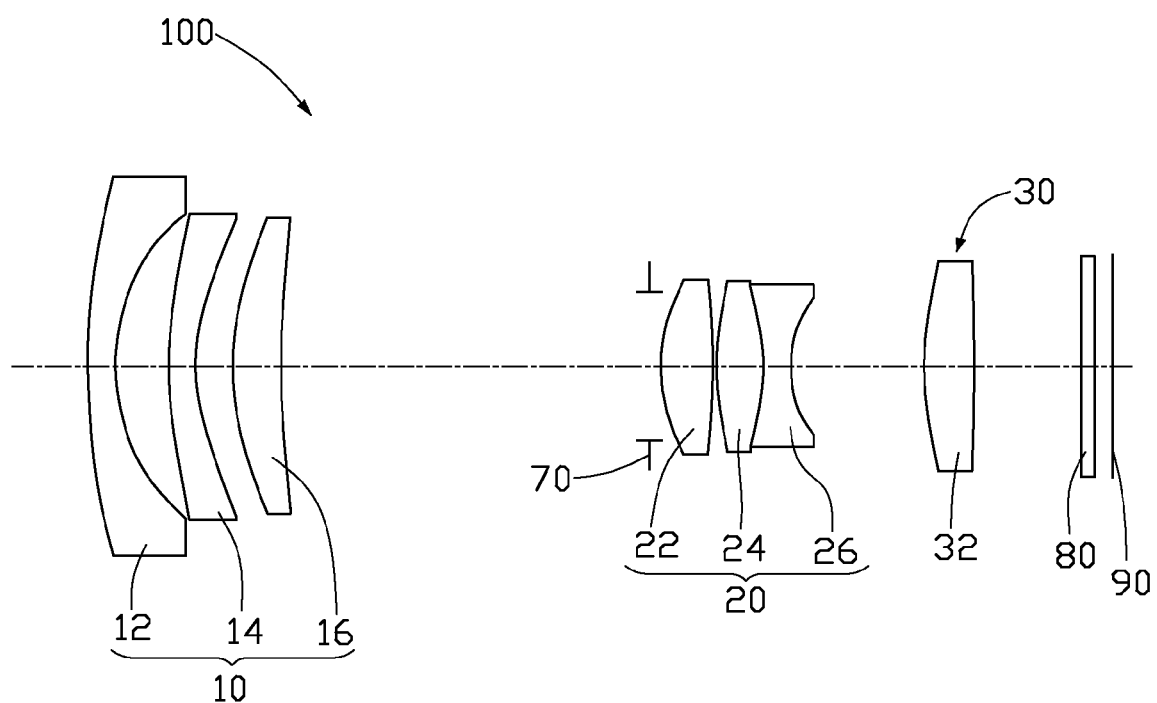
FIG. 1 is a schematic view of an optical zoom lens for use in imaging technology, which is in the wide angle state thereof, according to a first embodiment.
Figure 2:
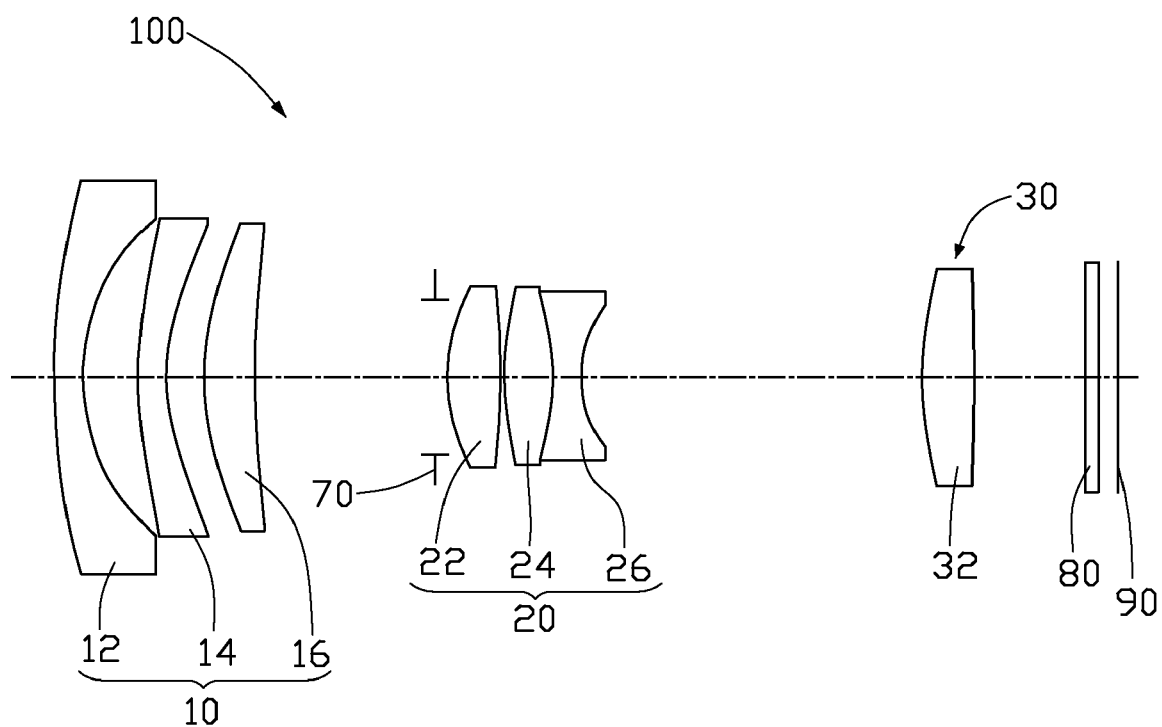
FIG. 2 is a schematic view of an optical zoom lens for use in imaging technology, which is in the middle state thereof, according to the first embodiment.
Figure 3:
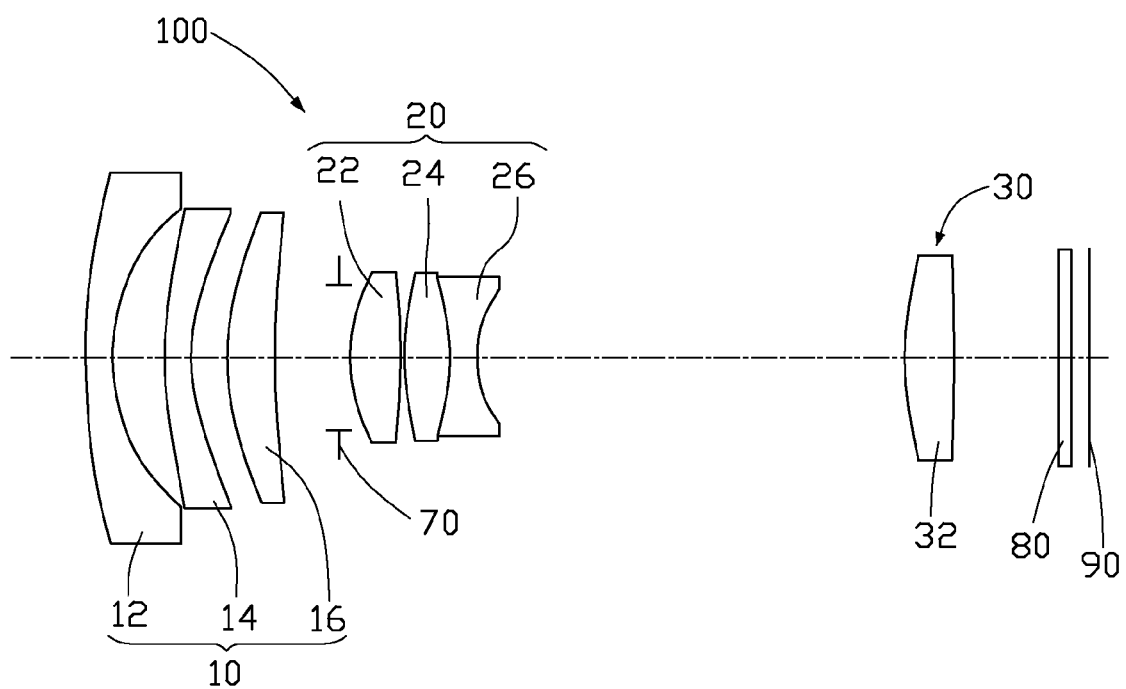
FIG. 3 is a schematic view of an optical zoom lens for use in imaging technology, which is in the telephoto state thereof, according to the first embodiment.

Referring to FIG. 1, an optical zoom lens 100, according to an exemplary embodiment, includes, in this order from the object side to the image side thereof, a first lens group 10, a second lens group 20, and a third lens group 30. The second lens group 20 and the third lens group 30 have a positive refraction power, while the first lens group 10 has a negative refraction power. The first lens group 10, the second lens group 20, and the third lens group 30 are movably mounted. Thereby, the effective focal length of the optical zoom lens 100 can be adjusted by moving the lens groups 10, 20 along the optical axis thereof, and focusing of the optical zoom lens 100 can be adjusted by moving the third lens group 30 along the optical axis thereof. In particular, the effective focal length can be reduced by moving the lens groups 10, 20 toward the image side of the optical zoom lens 100 until the optical zoom lens 100 is in a greatest wide angle state as shown in FIG. 1. Conversely, the effective focal length can be increased by moving the lens groups 10, 20 toward the object side of the optical zoom lens 100 until the optical zoom lens 100 is in a greatest telephoto state as shown in FIG. 3. When capturing an image, incident light enters the optical zoom lens 100, transmitting through the lens groups 10, 20, 30, and an infrared cut filter 80, and finally is focused onto an imaging plane 99 to form an image.

The optical zoom lens 100 satisfies the formulas of: (1) $-0.45 < Fw/f1 < -0.3$; and (2) $0.4 < f2/|f1| < 0.8$, where Fw is the smallest effective focal length of the optical zoom lens 100, i.e., the effective focal length of the optical zoom lens 100 in the wide angle state, f1 is the effective focal length of the first lens group 10, and f2 is the effective focal length of the second lens group 20.

The formula (1) ensures the optical zoom lens 100 has a large viewing angle, a minimal overall length, and good aberration balance. When $Fw/f1 < -0.3$ is satisfied, shortening the overall length of the optical zoom lens 100 in the wide angle state is achieved; when $-0.45 < Fw/f1$ is satisfied, the first lens group has a small dioptre, and the third lens group can be used for eliminating aberrations of the optical zoom lens 100, which leads to a low-cost optical zoom lens 100.

The formula (2) controls a magnification of the optical zoom lens 100, and fixes aberrations of the optical zoom lens 100. When $f2/|f1| < 0.8$ is satisfied, distortion and lateral chromatic aberration of the optical zoom lens 100 decrease; when $0.4 < f2/|f1|$ is satisfied, magnification of the optical zoom lens 100 can reach 2.5.

In order to satisfy an overall refractive power of the optical zoom lens 100, and to obtain a telecentric optical zoom lens 100, the optical zoom lens 100 further satisfies the formula: (3) $2.1 < f3/Fw < 3$, where f3 is the effective focal length of the third lens group 30.

Specifically, the optical zoom lens 100 further includes an aperture stop 70. The aperture stop 70 is positioned between the first lens group 10 and the second lens group 20 to reduce the size of light flux entering into the optical zoom lens 100. Namely, the aperture stop 70 is configured for blocking off-axis light rays entering the optical zoom lens 100 to prevent too much field curvature and distortion occurring in the optical zoom lens 100, since these off-axis light rays are the main cause of field curvature and distortion. In this embodiment, the aperture stop 70 is an opaque coating on the object side of the lens of the second lens group 20 nearest to the object side of the optical zoom lens 100 to shorten the overall length of the optical zoom lens 100, and reduce the cost of the optical zoom lens 100.

Specifically, the first lens group 10 includes, in this order from the object side to the image side of the optical zoom lens 100, a first lens 12 having negative refraction power, a second lens 14 having negative refraction power, and a third lens 16 having positive refraction power. Advantageously, at least two surfaces of the first lens group 10 at the image side of the optical zoom lens 100 are aspherical surfaces.

The second lens group 20 includes, in this order from the object side to the image side of the optical zoom lens 100, a fourth lens 22 having positive refraction power, a fifth lens 24 having positive refraction power, and a sixth lens 26 having negative refraction power. The fifth lens 24 and the sixth lens 26 are spherical lenses, and at least one surface of the fourth lens 22 is aspherical.

The third lens group 30 includes a seventh lens 32 having positive refraction power, and at least one surface of the seventh lens 32 is aspherical.

Opportunely and specifically, the first lens 12, and the fifth lens 24, and the sixth lens 26 are made of glass with consideration of imaging quality of the optical zoom lens 100. The second lens 14, the third lens 16, the fourth 22, and the seventh lens 32 are advantageously made of plastic to reduce the cost of the optical zoom lens 100.

Detailed examples of the optical zoom lens 100 are given below in company with FIGS. 4-15, but it should be noted that the optical zoom lens 100 is not limited by these examples. In the given detailed examples, the object-side surfaces and the image-side surfaces of the first lens 12, the fifth lens 24, and the sixth lens 26 are spherical, and the object-side surfaces and the image-side surface of the second lens 14, the third lens 16, the fourth lens 22, and the seventh lens 32 are aspherical.

The aspherical surface is shaped according to the formula:

$$x = \frac{ch^2}{1+\sqrt{1-(k+1)c^2h^2}} + \sum A_i h^i,$$

where h is a height from the optical axis of the optical zoom lens 100 to the aspherical surface, c is a vertex curvature, k is a conic constant, and $A_i$ are i-th order correction coefficients of the aspheric surfaces.

Listed below are the symbols used in these detailed examples:

f: effective focal length of the optical zoom lens 100;
$F_{No}$: F number;
2ω: field angle;
R: radius of curvature;
D: distance between surfaces on the optical axis of the optical zoom lens 100;
Nd: refractive index of lens; and
V: Abbe constant.

EXAMPLE 1

Tables 1, 2 and 3 show the lens data of Example 1, wherein f=6.27~17.9 millimeters (mm), Fw=6.27 mm, $F_{No}$=2.9~4.9, and 2ω=59°~22°.

TABLE 1

| Surface | R (mm) | D (mm) | Nd | V |
|---|---|---|---|---|
| Object-side surface of the first lens 12 | 24.41 | 1 | 1.69 | 48.5 |
| Image-side surface of the first lens 12 | 6.5 | 1.76 | — | — |
| Object-side surface of the second lens 14 | 11.16 | 1 | 1.531 | 56.04 |
| Image-side surface of the second lens 14 | 5.41 | 1.23 | — | — |
| Object-side surface of the third lens 16 | 8.25 | 1.86 | 1.6 | 26.64 |
| Image-side surface of the third lens 16 | 29.64 | D6(see table 3) | — | — |
| The surface of aperture stop 70 | infinite | 0.3 | — | — |
| Object-side surface of the fourth lens 22 | 5.45 | 1.909 | 1.531 | 56.04 |
| Image-side surface of the fourth lens 22 | −16.27 | 0.1 | — | — |
| Object-side surface of the fifth lens 24 | 10.73 | 1.724 | 1.74 | 44.7 |
| Image-side surface of the fifth lens 24 | −7.62 | 1 | 1.69 | 30.1 |
| Object-side surface of the sixth lens 26 | 3.85 | D12(see table 3) | — | — |
| Image-side surface of the sixth lens 26 | 12.83 | 1.9 | 1.531 | 56.04 |
| Object-side surface of the seventh lens 32 | −30.72 | D14(see table 3) | — | — |
| Image-side surface of the seventh lens 32 | infinite | 0.4 | 1.51 | 64.1 |
| Object-side surface of the infrared cut filter 80 | infinite | 0.5 | — | — |
| Image-side surface of the infrared cut filter 80 | infinite | 0.5 | 1.51 | 64.1 |
| Imaging plane 90 | infinite | 0.7 | — | — |

TABLE 2

| Surface | Aspherical coefficient |
|---|---|
| Object-side surface of the second lens 14 | k = 0.276; A4 = −4.17E−04; A6 = −1.45E−05; A8 = 6.94E−07; A10 = −6.93E−08; |
| Image-side surface of the second lens 14 | k = −0.24; A4 = −1.83E−0.; A6 = 1.38E−05; A8 = 8.07E−08; A10 = −2.28E−08; |
| Object-side surface of the third lens 16 | k = 0.365; A4 = −1.16E−03; A6 = 2.83E−05; A8 = −3.42E−08; A10 = −2.43E−08; |
| Image-side surface of the third lens 16 | k = −11.078; A4 = −6.98E−04; A6 = 1.43E−05; A8 = 1.40E−07; A10 = −1.74E−08; |
| Object-side surface of the fourth lens 22 | k = −1.03; A4 = 6.19E−05; A6 = 2.95E−05; A8 = −3.69E−06; A10 = 3.57E−07; |
| Image-side surface of the fourth lens 22 | k = 0.07; A4 = 4.77E−04; A6 = 2.71E−05; A8 = −4.18E−06; A10 = 4.28E−07; |
| Object-side surface of the seventh lens 32 | k = 0.639; A4 = 9.91E−04; A6 = −7.72E−05; A8 = 3.59E−06; A10 = −6.92E−08; |
| Image-side surface of the seventh lens 32 | k = 2.315; A4 = 1.76E−03; A6 = −1.30E−04; A8 = 5.46E−06; A10 = −9.88E−08; |

TABLE 3

| Variable coefficient | Wide angle state | Middle state | Telephoto state |
|---|---|---|---|
| D6 | 13.66 | 5.81 | 2.33 |
| D12 | 5.12 | 10.66 | 18.87 |
| D14 | 2.91 | 2.81 | 1.69 |

Figure 4:
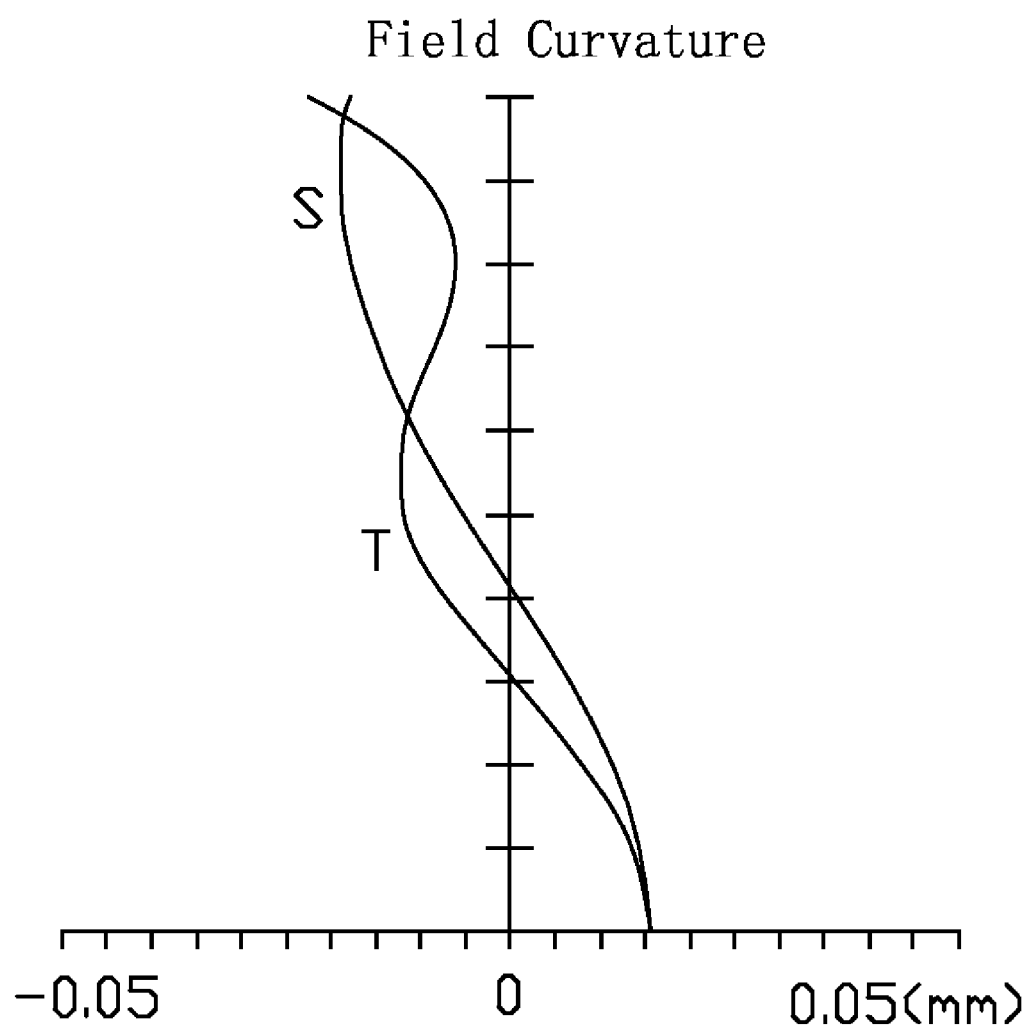
FIGS. 4~5 are graphs respectively showing field curvature, and distortion occurring in the optical zoom lens, that is in the wide angle state as in FIG. 1, according to a second embodiment.
Figure 5:
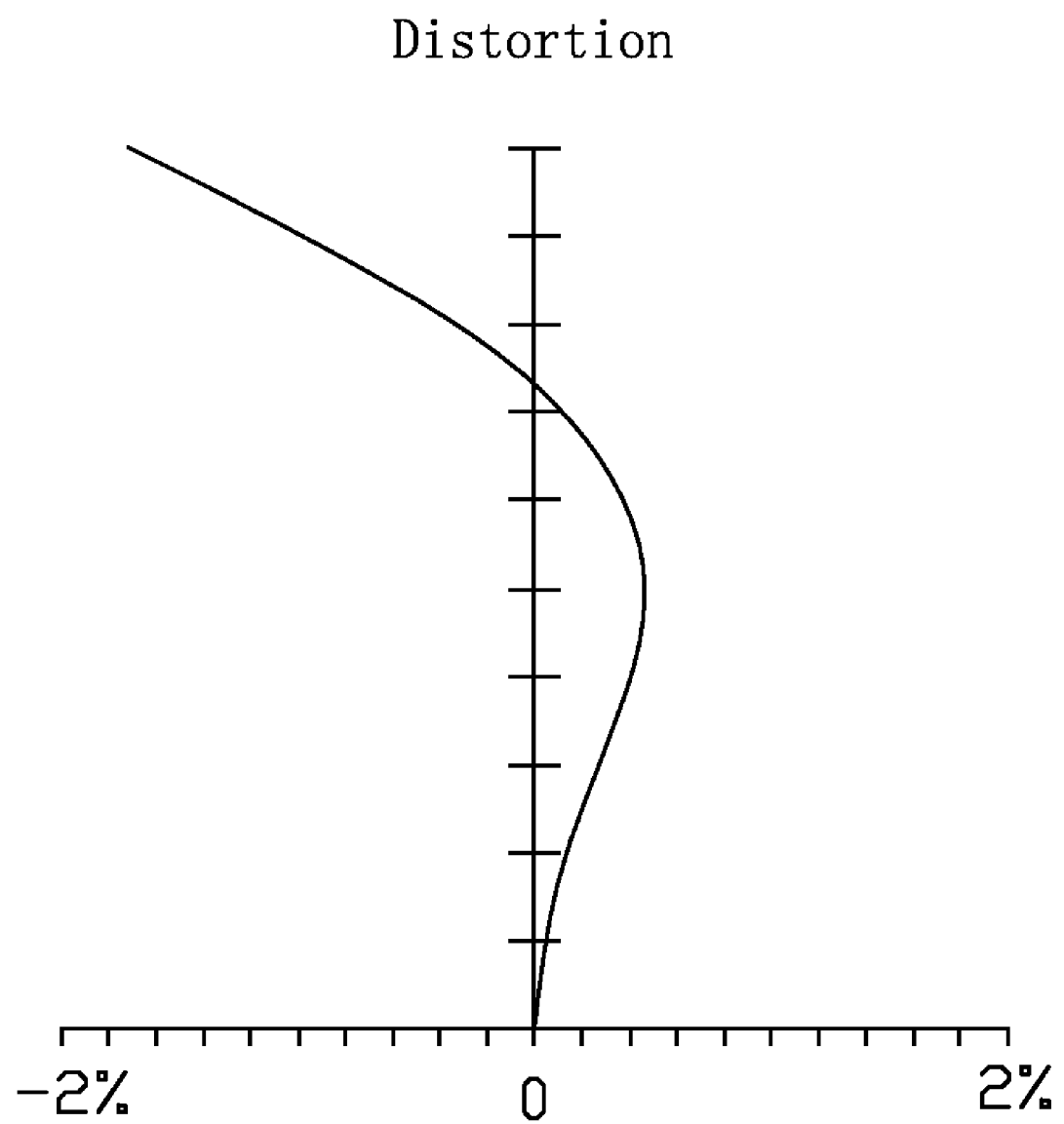

When the optical zoom lens 100 is in wide angle state, in FIG. 4, the curves t, s are the tangential field curvature curve and the sagittal field curvature curve respectively. Clearly, field curvature occurring in the optical zoom lens 100 of Example 1 is limited to a range of: −0.05 mm~0.05 mm. In FIG. 5, distortion occurring in the optical zoom lens 100 of Example 1 is limited to be within the range of: −2%~2%.

Figure 6:
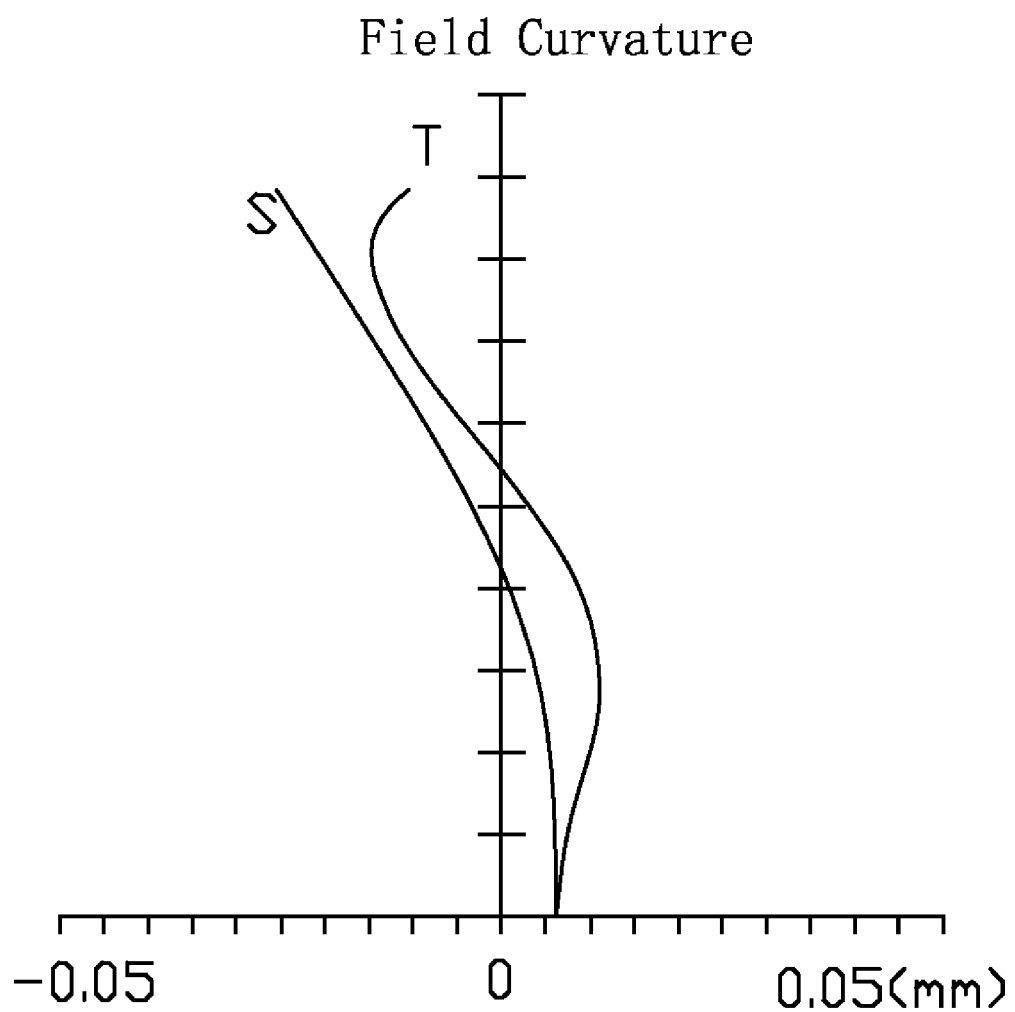
FIGS. 6~7 are graphs respectively showing field curvature, and distortion occurring in the optical zoom lens that is in the middle state as in FIG. 2, according to the second embodiment.
Figure 7:
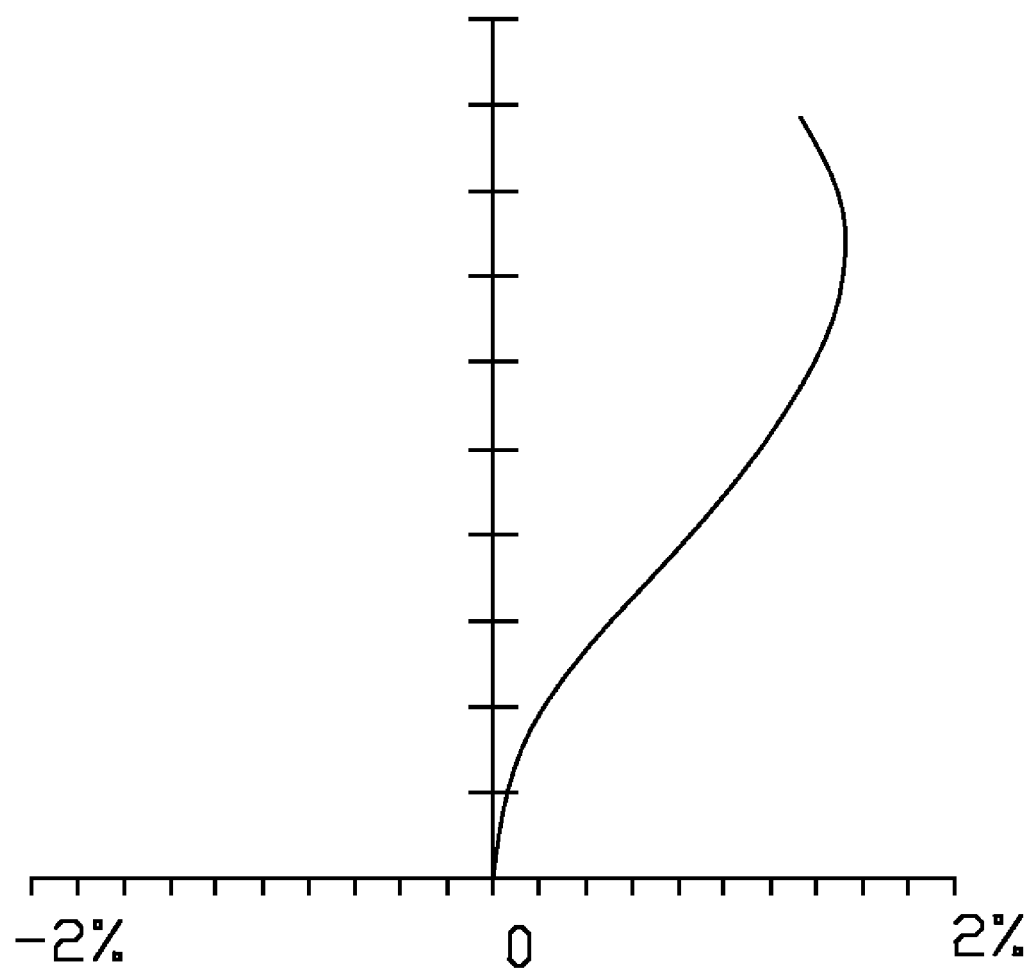

When the optical zoom lens 100 is in middle state, in FIG. 6, field curvature occurring in the optical zoom lens 100 of Example 1 is limited to a range of: −0.05 mm~0.05 mm. In FIG. 7, distortion occurring in the optical zoom lens 100 of Example 1 is limited to be within the range of: −2%~2%.

Figure 8:
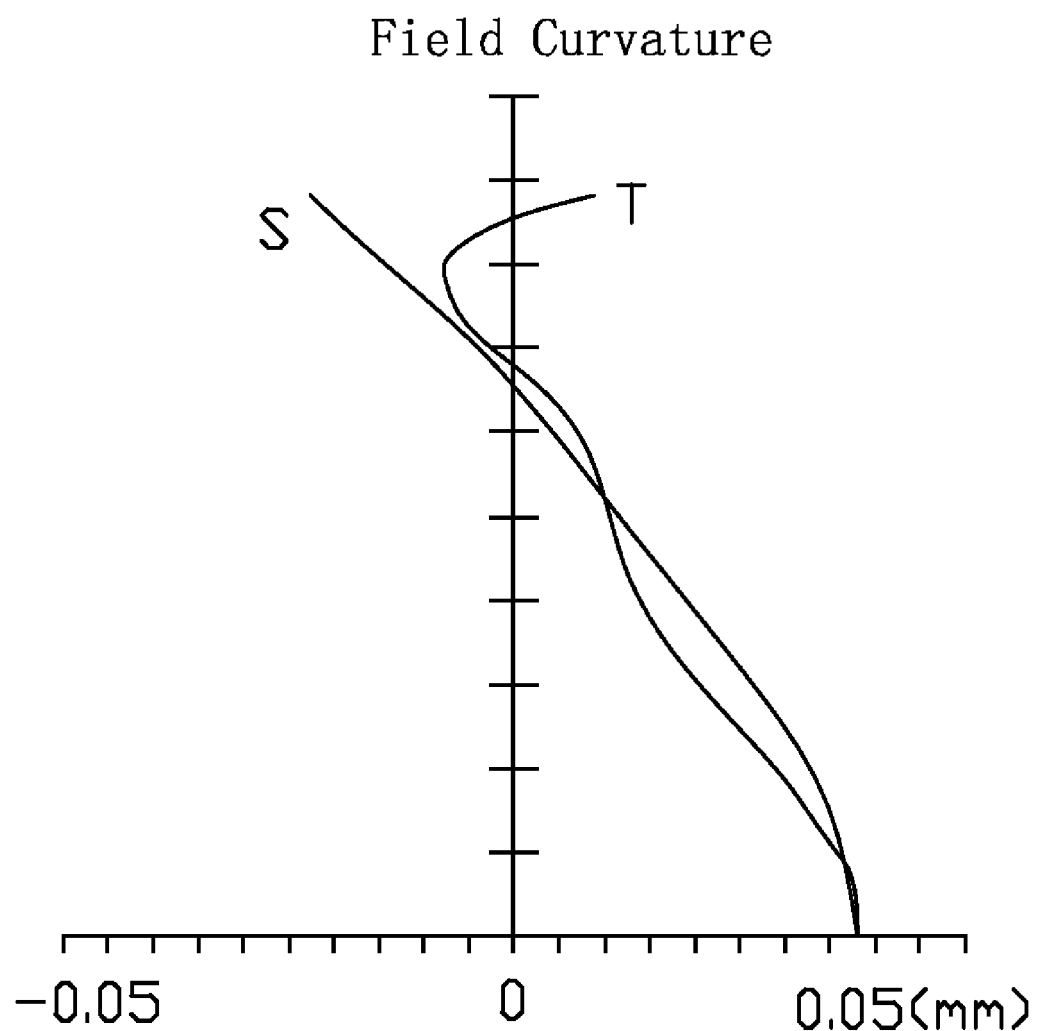
FIGS. 8~9 are graphs respectively showing field curvature, and distortion occurring in the optical zoom lens that is in the telephoto state as in FIG. 3, according to the second embodiment.
Figure 9:
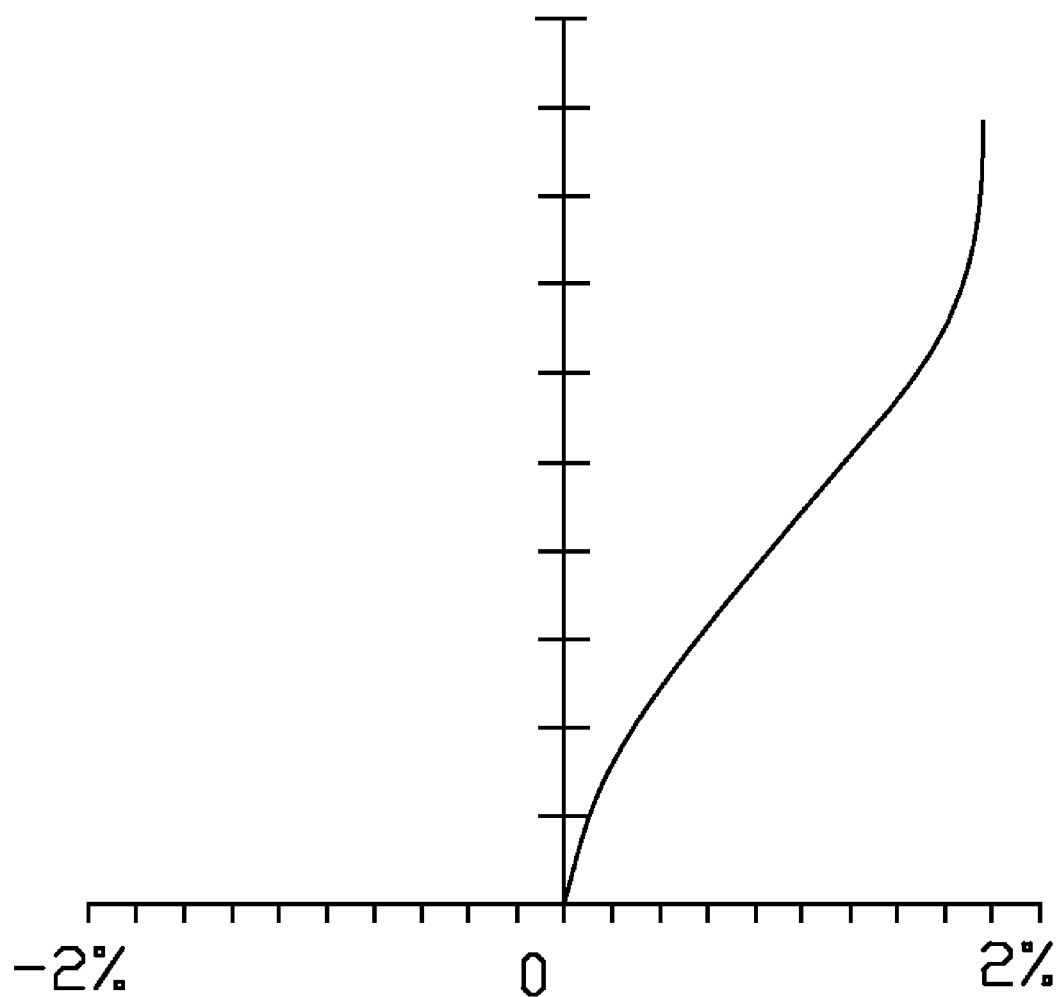

When the optical zoom lens 100 is in telephoto state, in FIG. 8, field curvature occurring in the optical zoom lens 100 of Example 1 is limited to a range of: −0.05 mm~0.05 mm. In FIG. 9, distortion occurring in the optical zoom lens 100 of Example 1 is limited to be within the range of: −2%~2%.

EXAMPLE 2

Tables 4, 5, and 6 show the lens data of EXAMPLE 2, wherein f=6.85~19.6 mm, Fw=6.85 mm, $F_{No}$=2.9~4.9, and 2ω=59°~22°.

TABLE 4

| Surface | R (mm) | D (mm) | Nd | V |
|---|---|---|---|---|
| Object-side surface of the first lens 12 | 23.59 | 1 | 1.69 | 48.5 |
| Image-side surface of the first lens 12 | 6.23 | 1.87 | — | — |
| Object-side surface of the second lens 14 | 8.99 | 1 | 1.531 | 56.04 |
| Image-side surface of the second lens 14 | 5.58 | 1.09 | — | — |
| Object-side surface of the third lens 16 | 8.86 | 1.84 | 1.6 | 26.64 |
| Image-side surface of the third lens 16 | 28.84 | D6(see table 6) | — | — |
| The surface of aperture stop 70 | infinite | 0.3 | — | — |
| Object-side surface of the fourth lens 22 | 5.76 | 2.03 | 1.531 | 56.04 |
| Image-side surface of the fourth lens 22 | −18.1 | 0.1 | — | — |
| Object-side surface of the fifth lens 24 | 10.26 | 1.71 | 1.74 | 44.7 |
| Image-side surface of the fifth lens 24 | −9.15 | 1 | 1.69 | 30.1 |
| Object-side surface of the sixth lens 26 | 4.03 | D12(see table 6) | — | — |
| Image-side surface of the sixth lens 26 | 16.6 | 1.82 | 1.531 | 56.04 |
| Object-side surface of the seventh lens 32 | −27.99 | D14(see table 6) | — | — |
| Image-side surface of the seventh lens 32 | infinite | 0.4 | 1.51 | 64.1 |
| Object-side surface of the infrared cut filter 80 | infinite | 0.5 | — | — |
| Image-side surface of the infrared cut filter 80 | infinite | 0.5 | 1.51 | 64.1 |
| Imaging plane 90 | infinite | 0.7 | — | — |

TABLE 5

| Surface | Aspherical coefficient |
|---|---|
| Object-side surface of the second lens 14 | k = 0.099; A4 = −4.43E−04; A6 = −1.60E−05; A8 = 5.55E−07; A10 = −4.61E−09; A12 = 5.65E−11 |
| Image-side surface of the second lens 14 | k = −0.298; A4 = −1.70E−03; A6 = 1.04E−05; A8 = 2.31E−07; A10 = −2.67E−08; A12 = 4.36E−11 |
| Object-side surface of the third lens 16 | k = 0.32; A4 = −1.16E−03; A6 = 3.57E−05; A8 = −1.22E−08; A10 = −2.53E−08; A12 = −1.67E−10 |
| Image-side surface of the third lens 16 | k = 8.24; A4 = −7.50E−04; A6 = 2.14E−05; A8 = −1.08E−07; A10 = −1.90E−08; A12 = 4.92E−11 |
| Object-side surface of the fourth lens 22 | k = −1.01; A4 = 7.74E−05; A6 = 3.21E−05; A8 = −3.21E−06; A10 = 2.65E−07; A12 = 2.27E−09 |
| Image-side surface of the fourth lens 22 | k = 1; A4 = 4.43E−04; A6 = 3.32E−05; A8 = −4.09E−06; A10 = 3.67E−07; A12 = 1.48E−09 |
| Object-side surface of the seventh lens 32 | k = −5.42; A4 = 9.96E−04; A6 = −6.93E−05; A8 = 3.17E−06; A10 = −6.30E−08; A12 = −2.50E−10 |
| Image-side surface of the seventh lens 32 | k = 3; A4 = 1.48E−03; A6 = −1.21E−04; A8 = 5.85E−06; A10 = −1.46E−07; A12 = 8.70E−10 |

TABLE 6

| Variable coefficient | Wide angle state | Middle state | Telephoto state |
|---|---|---|---|
| D6 | 14.62 | 4.90 | 1.94 |
| D12 | 5.80 | 12.10 | 19.45 |
| D14 | 3.03 | 3.20 | 2.15 |

Figure 10:
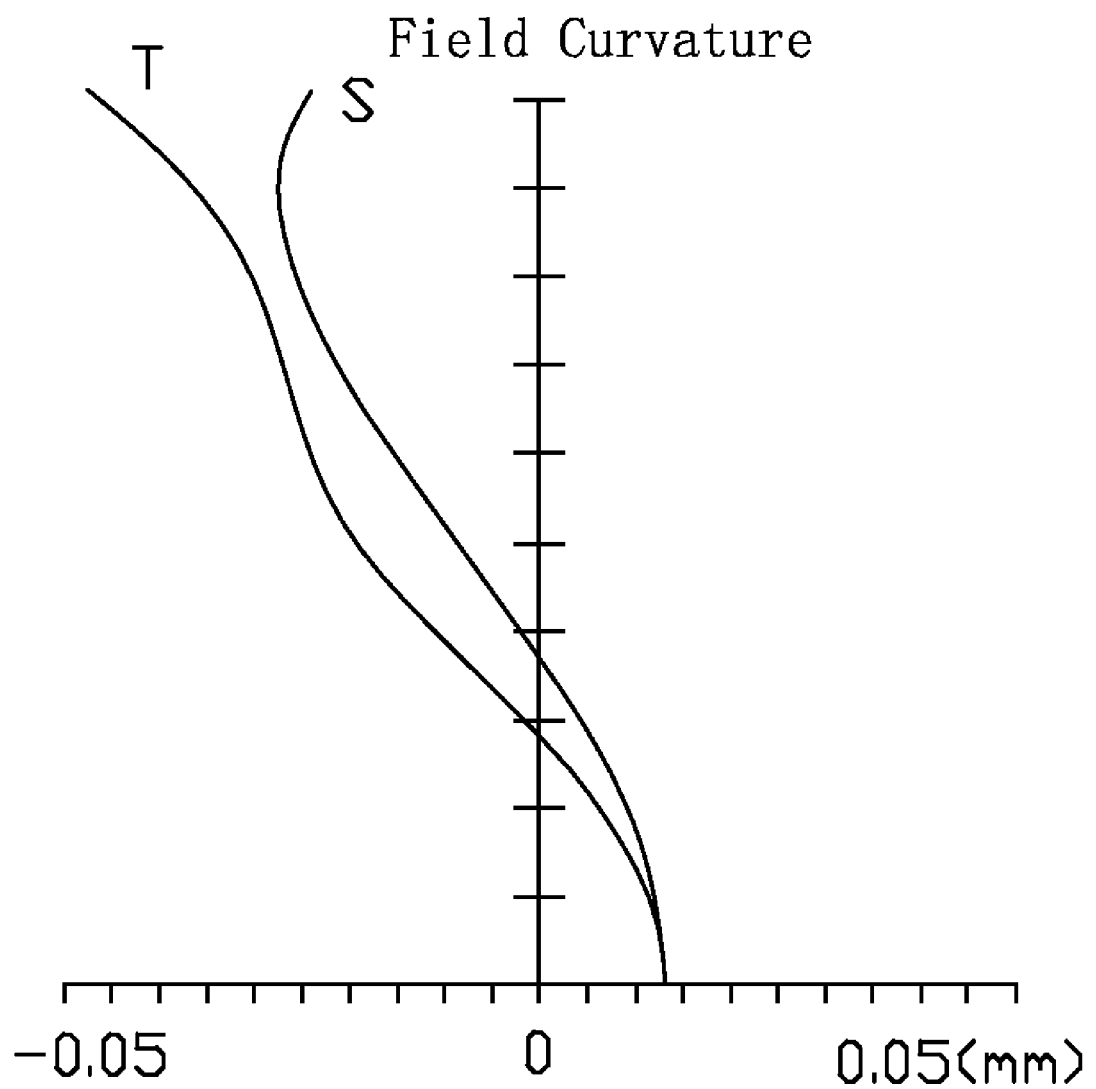
FIGS. 10~11 are graphs respectively showing field curvature, and distortion occurring in the optical zoom lens that is in the wide angle state as in FIG. 1, according to a third embodiment.
Figure 11:
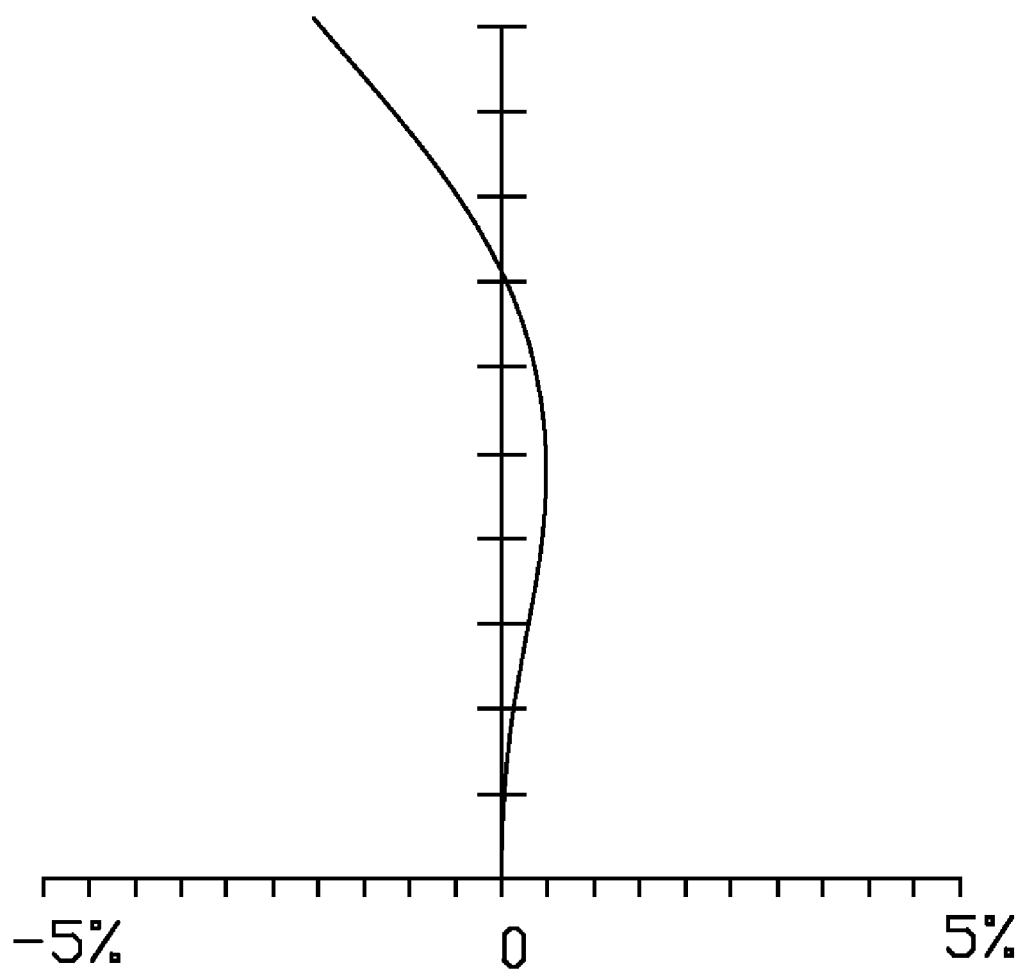

When the optical zoom lens 100 is in wide angle state, in FIG. 10, field curvature occurring in the optical zoom lens 100 of Example 2 is limited to a range of: −0.05 mm~0.05 mm. In FIG. 11, distortion occurring in the optical zoom lens 100 of Example 2 is limited to be within the range of: −5%~5%.

Figure 12:
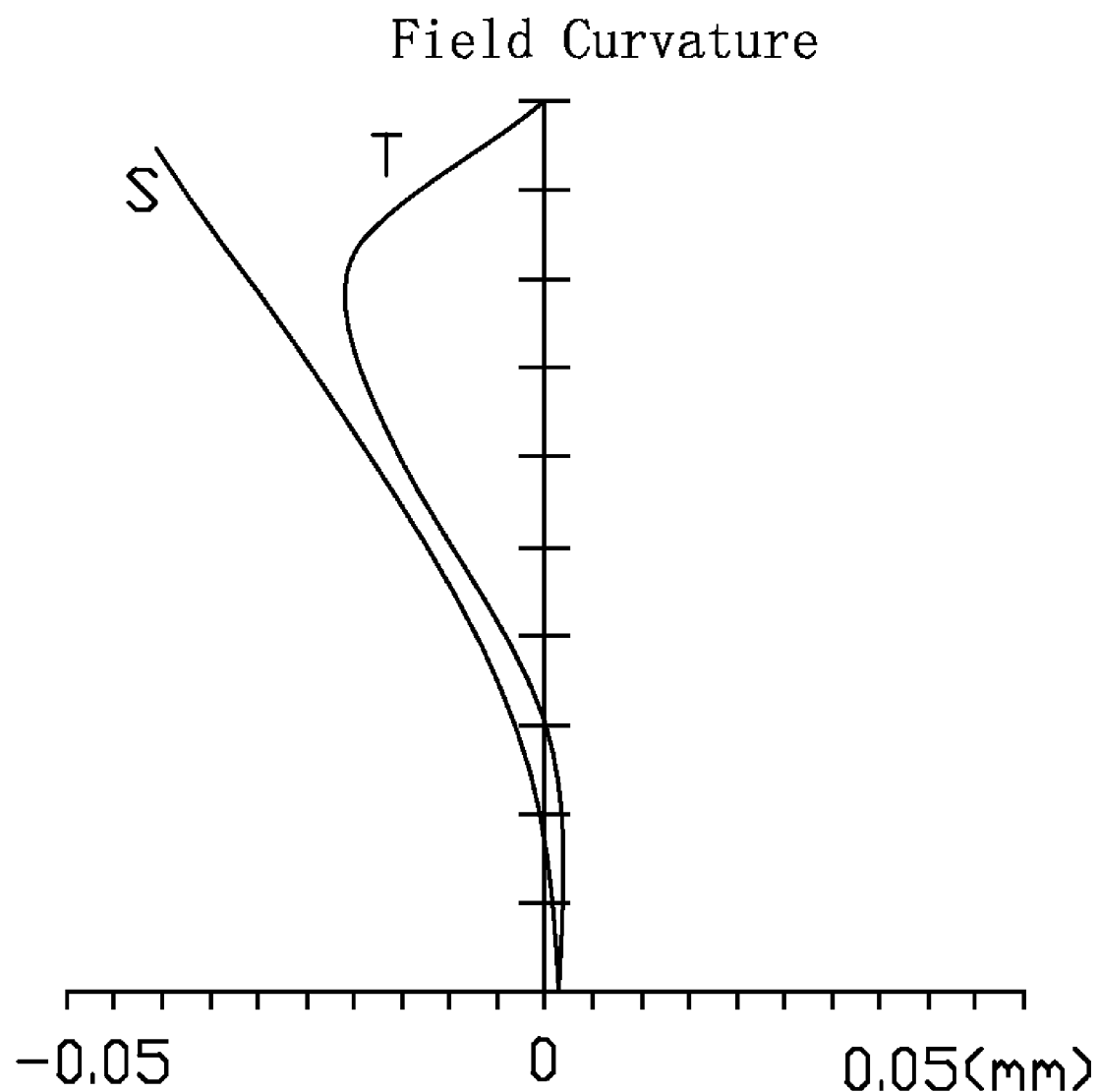
FIGS. 12~13 are graphs respectively showing field curvature, and distortion occurring in the optical zoom lens that is in the middle state as in FIG. 2, according to the third embodiment.
Figure 13:
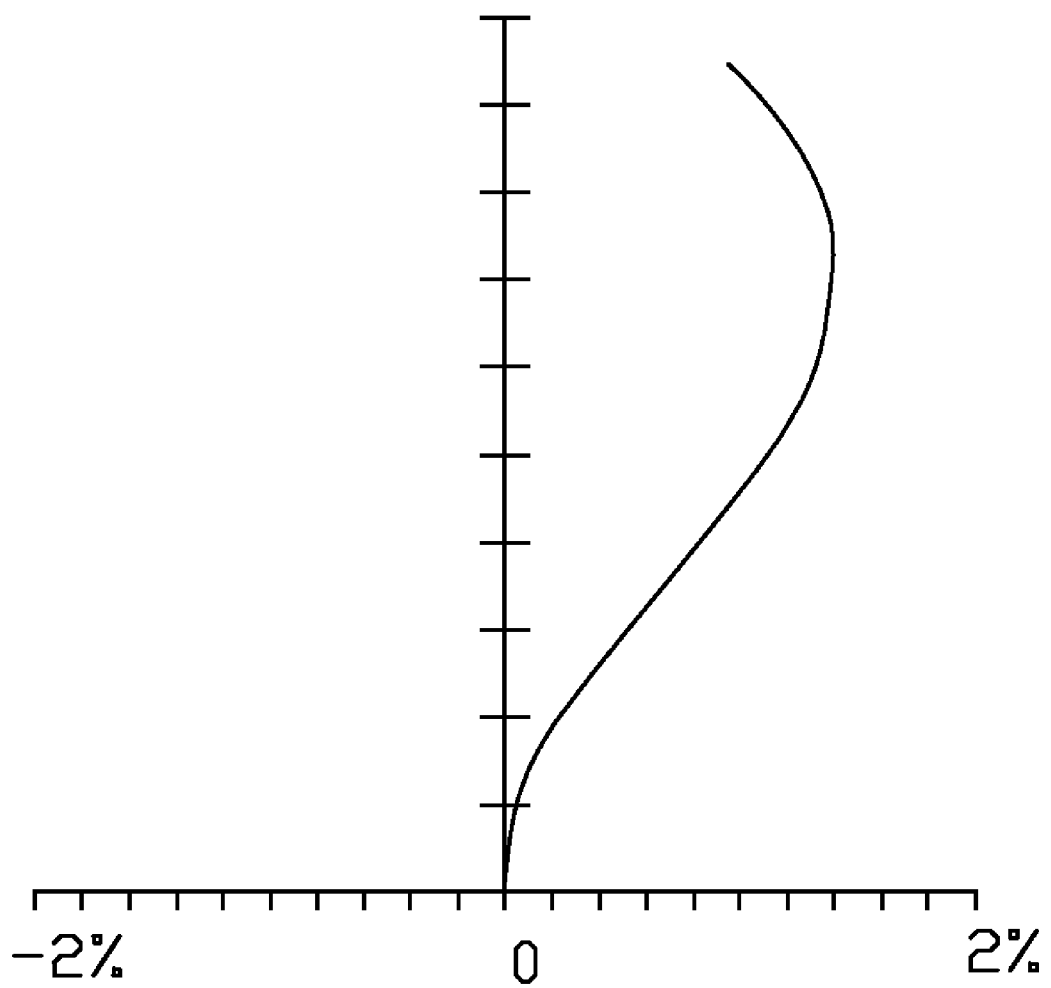

When the optical zoom lens 100 is in middle state, in FIG. 12, field curvature occurring in the optical zoom lens 100 of Example 2 is limited to a range of: −0.05 mm~0.05 mm. In FIG. 13, distortion occurring in the optical zoom lens 100 of Example 1 is limited to be within the range of: −2%~2%.

Figure 14:
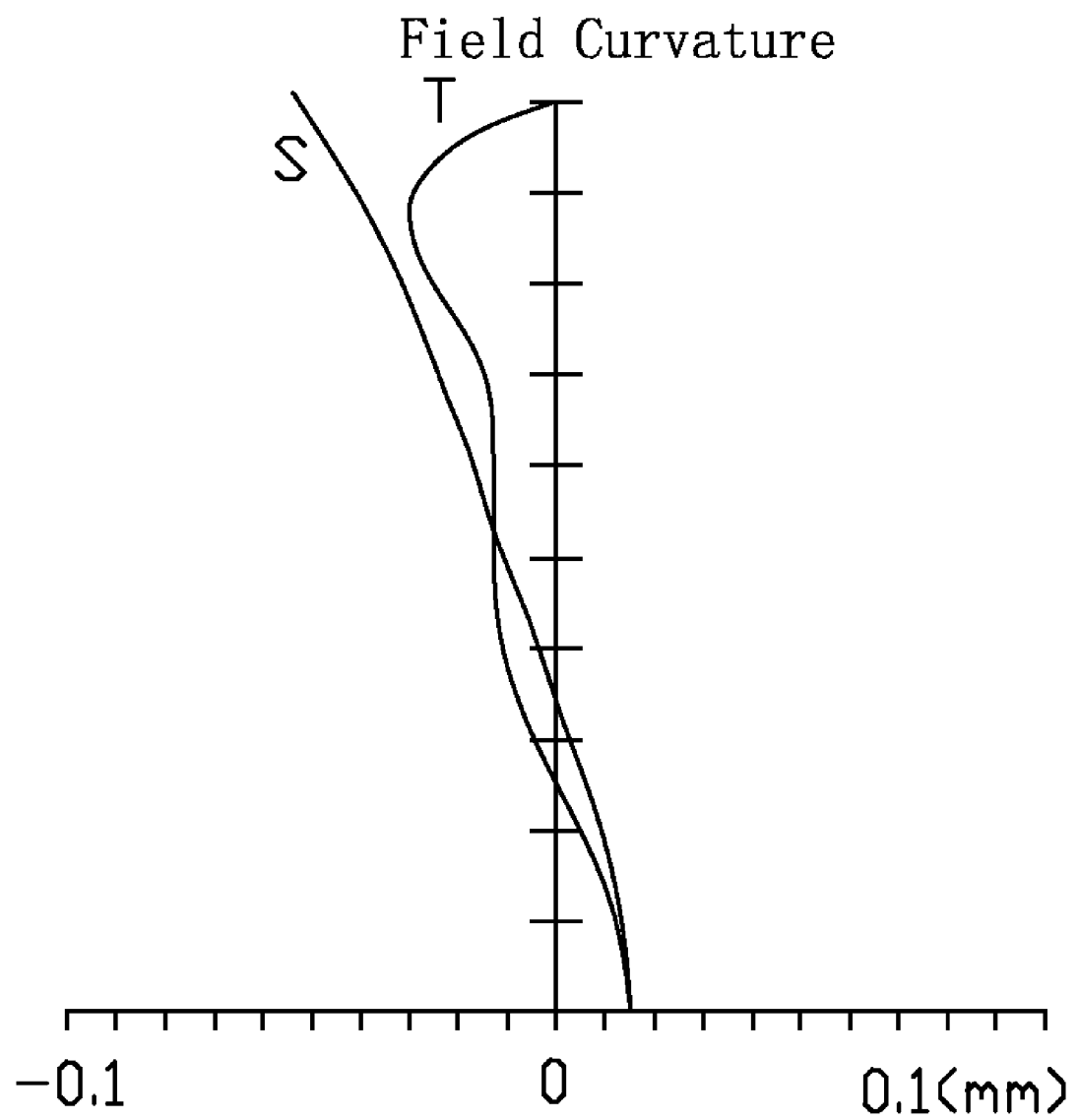
FIGS. 14~15 are graphs respectively showing field curvature, and distortion occurring in the optical zoom lens that is in the telephoto state as in FIG. 3, according to the third embodiment.
Figure 15:
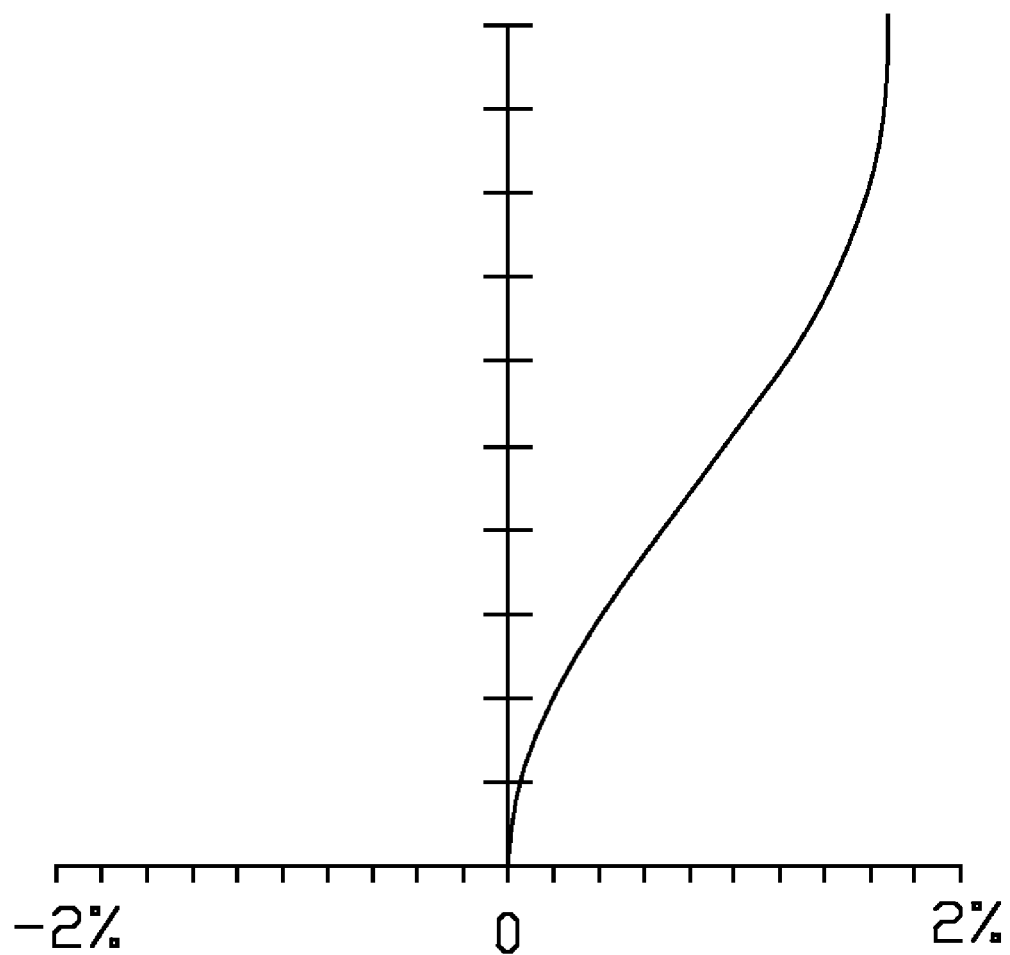

When the optical zoom lens 100 is in telephoto state, in FIG. 14, field curvature occurring in the optical zoom lens 100 of Example 2 is limited to a range of: −0.1 mm~0.1 mm. In FIG. 15, distortion occurring in the optical zoom lens 100 of Example 1 is limited to be within the range of: −2%~2%.

In all, in Examples 1~2, t6he overall length of the optical zoom lens 100 is short, and the optical zoom lens 100 appropriately corrects fundamental aberrations. Therefore, a favorable optical performance of the optical zoom lens 100 is obtained.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An optical zoom lens comprising, in this order from the object side to the image side thereof:
   a first lens group of negative refraction power;
   a second lens group of positive refraction power; and
   a third lens group of positive refraction power; the optical zoom lens satisfying the formulas of: −0.45<Fw/f1<−

0.3; $0.4<f2/|f1|<0.8$; and $2.1<f3/Fw<3$, where Fw is the smallest effective focal length of the optical zoom lens, f1 is the effective focal length of the first lens group, and f2 is the effective focal length of the second lens group, and f3 is the effective focal length of the third lens group.

2. The optical zoom lens as claimed in claim 1, further comprising an aperture stop positioned between the first lens group and the second lens group.

3. The optical zoom lens as claimed in claim 1, wherein the first lens group comprises at least three lenses.

4. The optical zoom lens as claimed in claim 3, wherein at least two surfaces of the at least three lenses of the first lens group at the image side of the optical zoom lens are aspherical surfaces.

5. The optical zoom lens as claimed in claim 3, wherein one lens of the first lens group nearest to the object side of the optical zoom lens is made of glass; two lenses of the first lens group nearest to the image side of the optical zoom lens are made of plastic.

6. The optical zoom lens as claimed in claim 1, wherein the second lens group comprises at least three lenses.

7. The optical zoom lens as claimed in claim 6, wherein the object-side surface of at least one lens of the at least three lenses of the second lens group is aspherical.

8. The optical zoom lens as claimed in claim 6, wherein one lens of the second lens group nearest to the object side of the optical zoom lens is made of plastic; two lenses of the second lens group nearest to the image side of the optical zoom lens are made of glass.

9. The optical zoom lens as claimed in claim 1, wherein the third lens group comprises at least one lens of positive refraction power, and the object-side surface and the image-side surface of the at least one lens are aspherical.

10. The optical zoom lens as claimed in claim 9, wherein the at least one lens of the third lens group is made of plastic.

11. The optical zoom lens as claimed in claim 1, further comprising an infrared cut filter being positioned at the image side of the third lens group.

* * * * *